United States Patent [19]
Binkerd et al.

[11] Patent Number: 4,827,500
[45] Date of Patent: May 2, 1989

[54] AUTOMATIC SPEECH RECOGNITION TO SELECT AMONG CALL DESTINATIONS

[75] Inventors: Mark S. Binkerd, Warrenville; Christine M. Buss, Naperville, both of Ill.; George W. Gawrys, Bridgewater, N.J.; Roger E. Stone, Naperville, Ill.

[73] Assignee: American Telephone and Telegraph Company, AT&T Bell Laboratories, Murray Hill, N.J.

[21] Appl. No.: 9,259

[22] Filed: Jan. 30, 1987

[51] Int. Cl.[4] ........................ H04M 3/50; H04M 7/00
[52] U.S. Cl. ...................................... 379/88; 379/207; 379/220
[58] Field of Search ...................... 379/88, 89, 67, 207, 379/211, 212, 201, 220

[56] References Cited

U.S. PATENT DOCUMENTS

| | | | |
|---|---|---|---|
| 4,054,756 | 10/1977 | Comella et al. | 379/89 |
| 4,611,096 | 9/1986 | Asmuth et al. | 379/207 |
| 4,757,267 | 7/1988 | Riskin | 379/113 |

FOREIGN PATENT DOCUMENTS

| | | | |
|---|---|---|---|
| 3422409 | 12/1985 | Fed. Rep. of Germany | 379/88 |
| 57-125564 | 11/1982 | Japan . | |
| 57-141166 | 12/1982 | Japan . | |
| 0181356 | 10/1983 | Japan | 379/88 |
| 0086357 | 5/1984 | Japan | 379/89 |

OTHER PUBLICATIONS

"Speech Processing in Public Telephone Exchanges", R. Christensen et al., *Electrical Communication*, vol. 59, No. 3, May 1985, pp. 266-272.

"Application of Speech Recognition and Synthesis to PABX Services", Mulla and Vaughan, *Electrical Communication*, vol. 59, No. 3, May 1985, pp. 273-280.

"The AT&T Multi-Mode Voice Systems-Full Spectrum Solutions for Speech Processing Applications", S. D. Hester et al., Proceedings of the 1985 AVIOS Conference, Sep. 1985.

G. W. Gawrys et al., "A New Protocol for Call Handling Functions for the SPC Network", *Globecom '82*, (Conference Record, IEEE Global Telecommunications Conference), vol. 2 of 3, Miami, Nov. 29-Dec. 2, 1982, pp. 735-738.

G. A. Raack et al., "Customer Control of Network Services", *IEEE Communications Magazine*, vol. 22, No. 10, Oct. 1984, pp. 8-14.

"SR-2500 Voice Processor System", *NEC* (Manufacturers Brochure), 1985, NEC Corporation, pp. 1-4.

C. M. Buss, "Turning the Human/Machine Interface for AT&T Advanced 800 Service", *Globecom '85, IEEE Global Telecommunications Conference*, vol. 3, New Orleans, La., Dec. 2-5, 1985, pp. 35.3.1-35.3.4.

*Primary Examiner*—Thomas W. Brown
*Attorney, Agent, or Firm*—Werner Ulrich

[57] ABSTRACT

A method and apparatus for setting up a telecommunications call from a calling customer (caller) terminal to one of a plurality of call destinations through an interconnection network. The caller dials an 800 number. This number is identified in a first data base as indicating a plurality of possible services, each of which is associated with one or more call destinations. A second data base provides the identification of a switch for generating an announcement to the customer and for the identification of an announcement in that switch. The call is connected to that announcement and an automatic speech and tone recognition unit, and the announcement prompts the caller to speak a command or key a dual tone multifrequency (DTMF) signal in order to select one of the possible destinations. Based on the number dialed by the caller, the Numbering Plan Area (NPA) code of the caller plus the command keyed or spoken by the caller and recognized by the recognition unit, one of a plurality of POTS (plain old telephone service) telephone numbers is selected by the second data base and the call is routed to a destination identified by that POTS telephone number. Advantageously, such an arrangement permits a business to use a single directory number for serving a plurality of services of the business, to select among these services on the basis of a command spoken or a DTMF signal keyed by a caller in response to an announcement of that business, and permits the business to receive the call at an appropriate destination for processing that call.

16 Claims, 5 Drawing Sheets

AUTOMATIC SPEECH RECOGNITION TO SELECT AMONG CALL DESTINATIONS

TECHNICAL FIELD

This invention relates to methods and apparatus for setting up, under the control of automatic speech processing, communications from a customer station to an attendant position or announcement.

PROBLEM

A large number of telephone calls are set up between telephone callers and an attendant of a business, or an information announcement from that business. For such calls, it is important to minimize attendant work time, for example, by automatically categorizing the type of request of a caller and steering the call to one of a specialized group of attendants, who may be located in different geographic locations, or by selecting an appropriate information announcement without requiring the services of an attendant. This saves the time of an initial attendant for making an initial inquiry and setting up a second connection to a more specialized attendant who can handle the specialized inquiries.

One prior art private branch exchange (PBX) arrangement permits callers to dial a telephone number and then be connected to a particular PBX attendant or group of attendants within the PBX through the use of a speech command. The incoming call from the caller to the PBX is connected to an announcement within the PBX directing the caller to speak a command such as a number, in order to be connected to an appropriate attendant within the PBX. An automatic speech recognition unit in the PBX recognizes a spoken command on the incoming call and causes the PBX to connect that call to the appropriate attendant. A problem of the prior art is that this arrangement is restricted to PBX applications. The art has no facility for enabling a common carrier telephone network to serve a voice processed call routed over a common carrier shared by many customers.

Another prior art service steers calls from callers to an appropriate destination in response to tones keyed by the callers. The Call Prompter feature of Advanced 800 Service, offered by AT&T Communications operates as follows: A caller dials an 800 number identifying the business with which the caller wishes to communicate. The system returns an announcement asking the caller to key or dial a 1, in order to detect whether the caller is using a dual tone multifrequency (DTMF) key station. If the caller is not calling from a DTMF key station and dials a 1, which cannot be transmitted through a public telephone toll network, the caller is routed to a general attendant of the business. However, if the caller has a DTMF key station and keys a 1, which can be transmitted through a public telephone toll network, the caller receives a prompting announcement asking the caller to key one of several numbers in order to receive one of several specialized services. One of several groups of announcement facilities or attendants who provide a specialized service is identified by the keyed number and the customer is connected to one of the announcement facilities or attendants of that group.

A problem in the latter prior art is that while this service satisfactorily processes calls from callers using DTMF key stations, it does not efficiently process calls from callers not using such telephone stations, which must therefore be served initially by a general attendant; further, even callers using a DTMF station must key an extra (preliminary) digit.

More generally, a problem of the prior art is that there is no method heretofore for a caller from a dial or keyed dial pulse telephone station to select by a speech command among a plurality of services offered to callers who dial a specific outside telephone number.

SOLUTION

The foregoing problems and deficiency are solved and an advance is made in the art in the illustrative embodiment of our invention by having exemplary facilities in the common carrier network and data bases connected to the network for processing a voice command so that calls are routed to the most appropriate call destination for offering a requested service, and significantly, are routed automatically without regard to whether the caller is using a dial pulse or DTMF station. In response to receipt of a special service directory number, such as an 800 number, a first data base is accessed and a first routing message is generated by that data base. If the first data base determines that the special service number specifies a plurality of possible services, each service having one or more possible call destinations, the first data base generates a first routing message to set up the call to an action control point for further processing. A second data base, accessed by the action control point, generates another message, in response to which, in a departure from the prior art, the common carrier network connects the call to an automatic speech recognition unit for recognizing a speech command from the caller. The second data base also generates a message identifying an announcement. The caller is connected to that announcement which prompts the caller with a speech command, for example, one of several numbers, required for connection to one of several services defined by the announcement. When one of the group of the allowed speech commands is recognized by the recognition unit, the second data base is accessed using data representing the recognized command, and data associated with the call. The data associated with the call includes the number plan area (NPA) code of the caller's telephone number and data identifying the number dialed or keyed by the caller. The second data base generates a routing message specifying the particular destination by a POTS (Plain Old Telephone Service) telephone number. The common carrier network routes the call to the destination specified by that POTS number. The possible call destinations are non-common carrier communication facilities served by the common carrier network that may include one or more information announcements, PBX's, automatic call distributors or individual customer stations. If none of the allowed commands is recognized, the second data base is accessed using data representing a default command instead of data representing a recognized command for generating a routing message for connecting the caller to a default destination such as a general attendant.

In one exemplary embodiment of the invention, if the caller is calling from a tone generating customer station, such as a DTMF station, the caller may speak or key a command. A spoken command is recognized only if spoken during a silent interval between segments of an announcement because it is difficult to isolate the two directions of speech transmission adequately so that the announcement does not interfere with the capability of an automatic speech recognition unit to recognize a spoken command. In contrast, a keyed command may be keyed during the prompting announcement or during a silent interval since a DTMF signal is sufficiently distinctive so that it can be detected even in the presence of an outgoing announcement message. Advantageously, such an arrangement minimizes the time required for frequent callers using DTMF stations to specify their requests while also permitting callers at dial stations to specify their requests, all without requiring attendant intervention to detect the requests. Further, such an arrangement expedites calls by eliminating the need for a preliminary announcement and the requirement to dial a 1.

In an alternative embodiment of the invention, the caller is prompted to dial or key a 1 initially. If a DTMF keyed 1 is recognized, the call is processed on the assumption that the caller will key the command. However, if no DTMF keyed 1 is recognized, the caller is connected to an announcement to prompt the caller to speak a command and voice processing unit attached to the connection detects that command. Advantageously, this type of arrangement offers savings of attendant work time for calls from callers without DTMF stations.

More generally, a call is automatically routed through a common carrier network partly in response to data associated with the call, and, in a departure from the prior art, data representing a speech command recognized on the call, the speech command data and the associated call data being used for controlling a data base means for deriving data for routing the call.

DETAILED DESCRIPTION

Conventional telephone service is referred to as POTS (plain old telephone service) and has the characteristic that a caller dials a number completely identifying a destination, typically, the terminal equipment of a called customer. The call is then set up from a local switch connected to the calling customer through one or more interconnected toll switches to a second local switch connected to the called customer and thence to that customer. For more specialized services such as the 800 or Inward Wide Area Telephone Service (IN-WATS), an additional step is taken to translate a customer dialed or keyed 800 number (i.e., a number with a numbering plan area (NPA) prefix of 800) to a POTS number so that thereafter the call may be set up in the same manner as a POTS call. The data base for performing this translation is at a network control point and is accessed via a common channel signaling network in conformance with the principles of the stored program controlled network described in *The Bell System Technical Journal*, Vol. 61, No. 7, Part 3, September 1982, pp. 1573–1803. In particular, 800 service using the capabilities of the stored program controlled network is described on pages 1737–1758 and is further described in R. P. Weber, U.S. Pat. No. 4,191,860 (Weber).

Advanced 800 Service permits a caller to specify one of a plurality of services, all having the same 800 number, by keying one or more digits in response to a prompting announcement to make a selection among that plurality of services. The plurality of services might, for example, be an ordering department, several different sources of attendant supplied information, and one or more up-to-date recorded announcements, all from one business. Some of these services may be provided from one call destination such as one PBX, and others may be provided regionally or locally, from one of many PBX's, the particular PBX being selected on the basis of the location of the caller. In the prior art, however, it is required that a caller who wishes to make a selection among the plurality of services have a station that is equipped with dual tone multifrequency (DTMF) signaling capability since dial pulses are not transmitted through the public switched telephone (PST) toll network. It is an objective of the present invention to make the Advanced 800 facilities available also to customers who have dial telephones.

Figure 1:
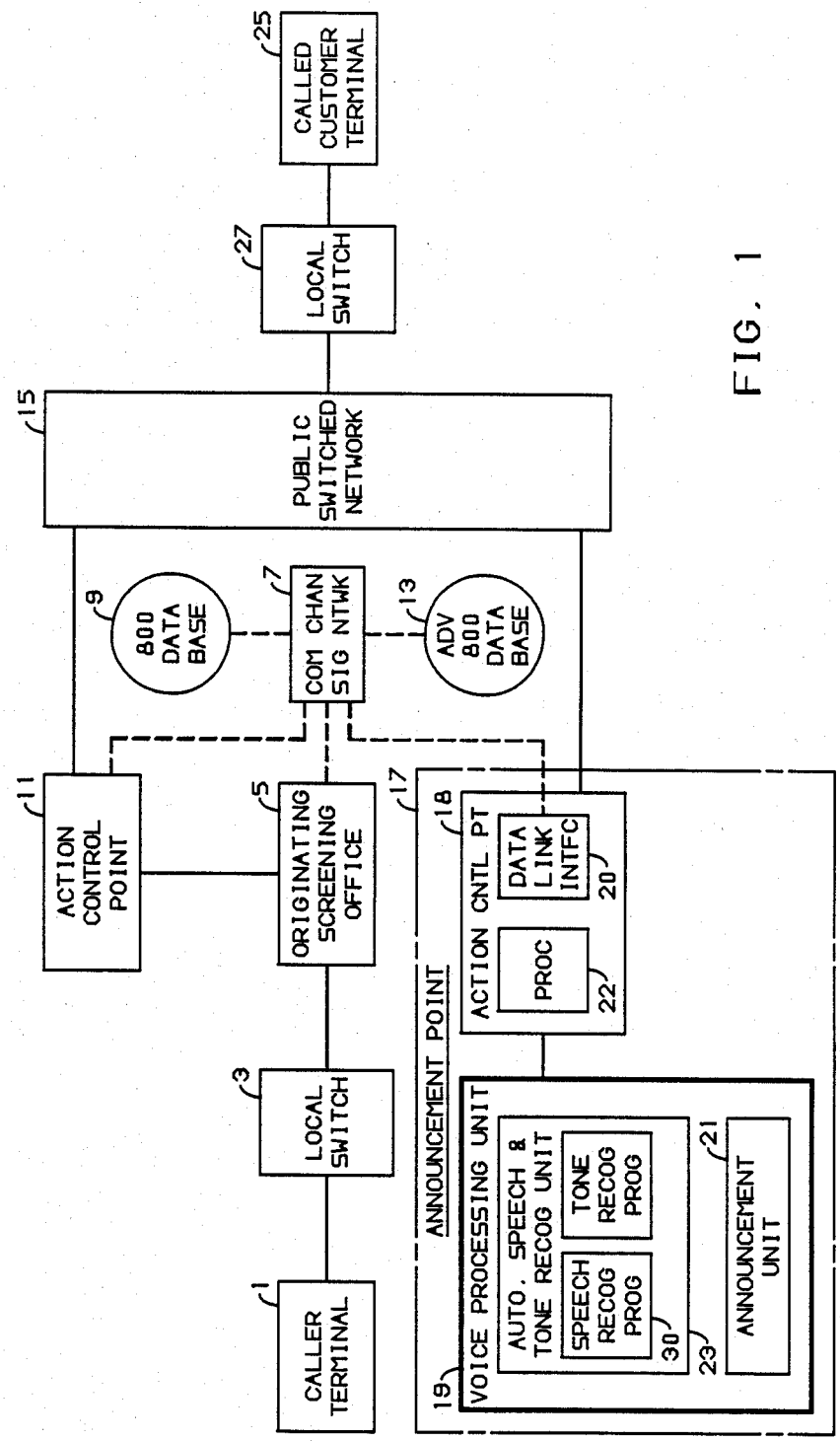
FIG. 1 is a block diagram of a telecommunications network for implementing the present invention.

FIG. 1 is a block diagram showing voice (solid lines) and data (dashed lines) connections for setting up a call in accordance with the principles of this invention. The call is initially set up from a caller at caller terminal 1 to local switch 3 serving that caller. The caller may be a customer or a computer controlled system. The local switch makes a translation of the number that was dialed by the caller, 1-800-555-1234, and recognizes that the call must be set up to an originating screening office (OSO) 5 for further call processing. OSO 5 determines that the caller has dialed an 800 number and transmits a request for data via common channel signaling network (CCSN) 7 to the 800 data base (800 DB) 9. CSSN 7 is a well-known common channel signaling network comprising one or more signal transfer points. 800 DB 9 responds by returning a message to OSO 5 to set up a connection to an action control point (ACP) 11 which can process this type of Advanced 800 call. The action control point is a switch with toll switching capability and, in some cases, may be the same switch as OSO 5. ACP 11 sends a message via CCSN 7 to Advanced 800 data base (A-800 DB) 13 requesting information on how this call is to be routed. A-800 DB 13 returns a message via CCSN 7 to ACP 11 indicating that this call requires the use of announcement point (ANNP) 17. Announcement point 17 comprises another action control point, ACP 18, and, in some cases, may be the same as ACP 11. ANNP 17 also comprises a voice processing unit. An example of the type of switch which can be used as an action control point is the 4 ESS TM switch, a stored program controlled switch, manufactured by AT&T Technologies, Inc., and described, for example, in *The Bell System Technical Journal*, V. 56, No. 7, pp. 1015–1320, September 1977. The connection between ACP 11 and ANNP 17 is set up over the public switched network (PSN) 15; alternatively, a direct connection may exist between ACP 11 and ANNP 17. A-800 DB 13 sends a message to ANNP 17 identifying which announcement should be returned to the caller on that call. ANNP 17 connects the call to an automatic voice processing unit (VPU) 19 which comprises announcement unit (AU) 21 and automatic speech/tone recognition unit (ASTRU) 23. VPU 19 is shown in heavy outline to emphasize that this unit is key to the implementation of the invention. VPU 19 may be any of a number of commercially available voice processing units such as the Conversant TM 1 Voice System manufactured by AT&T Conversant Systems. Such a unit, which is program controlled, can be arranged to recognize tones as well as a group of speech commands by the addition of an appropriate tone recognition program to the speech recognition program. AU 21 returns prompting announcements to the caller. ASTRU 23 recognizes spoken commands, such as numbers, and DTMF signals keyed at caller station 1 in response to these prompting announcements. Speech recognition program 30 and tone recognition program 31 are used within ASTRU 23 to process incoming signals in order to identify speech utterances and tone signals. Data signals representing spoken commands or DTMF signals which are recognized by ASTRU 23 are returned to processor 22 of ACP 18 within ANNP 17 and data represented by these signals or commands is transmitted thence as data within data messages from data link interface 20, a part of ACP 18 within ANNP 17, via CCSN 7 to A-800 DB 13. Processor 22 may be a processor such as the 1A Processor used in the 4 ESS switch, or may be a distributed processing system such as that used in the 5ESS TM switch manufactured by AT&T Technologies, Inc., and described for example, in U.S. Pat. No. 4,322,843 by H. J. Beuscher et al. The A-800 DB 13 translates this additional information along with the previously received information of the number dialed by a caller and the NPA of the caller to generate a POTS number for use by ACP 11 to route the call. This number is passed via CCSN 7 back to ACP 11. In repsonse to the message transmitting this POTS number, ACP 11 causes the connection to ANNP 17 to be dropped and requests a connection through PSN 15 via a local switch 27 to the called customer terminal 25 identified by the POTS number.

Figure 2:
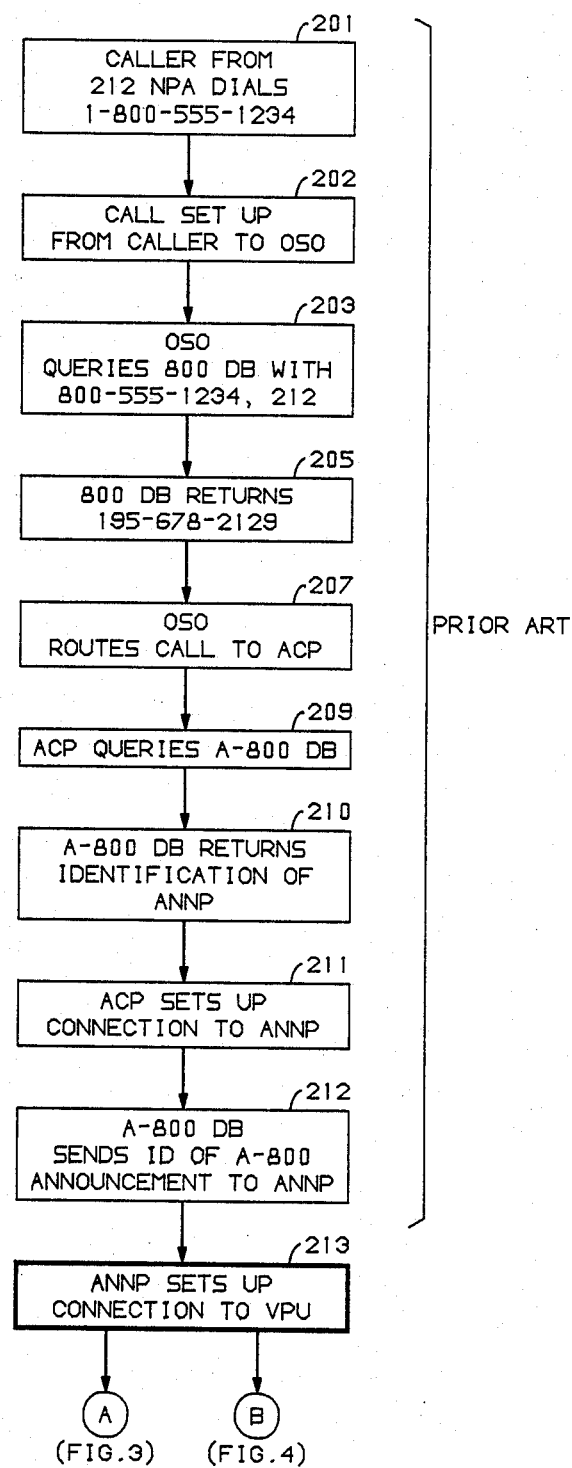
FIGS. 2, 3, and 4 are flow diagrams of alternate methods for setting up a connection from a caller to a called customer terminal.

FIG. 2 illustrates the steps of setting up a connection from a caller using a dial or DTMF telephone to an appropriate destination using Advanced 800 Service modified in accordance with the principles of this invention. First, the caller, assumed to be in the 212 numbering plan area (NPA), dials the number 1-800-555-1234 (action block 201). This number is translated in the local switch 3 connected to the caller where it is determined that to further set up this call, a connection must be established to OSO 5 (action block 202). OSO 5 then queries 800 DB 9 with the NPA of the caller and the 800 number dialed by that customer (action block 203). If this were a conventional 800 call, 800 DB 9 would simply return the POTS number to which this call is to be routed in accordance with the principles discussed in the previously cited references. However, if 800 DB 9 determines that this call requires Advanced 800 Service using the Call Prompter feature, the 800 DB 9 returns data identifying the special treatment required (action block 205). This data comprises a number (195-678-2129) including a prefix 195 identifying the call as an Advanced 800 call, followed by three additional information digits (678) identifying the particular Advanced 800 customer, followed by the numbering plan area (NPA) of the calling customer (212), followed by a fourth digit (9) identifying the particular Advanced 800 customer. (The four identifying digits in this case are assumed to be 6789.) OSO 5 recognizes from the 195 prefix that this is an Advanced 800 call and recognizes the need to utilize a toll switch equipped to further process Advanced 800 calls, namely, ACP 11. OSO 5 routes the call to ACP 11 (action block 207). OSO 5 transmits data identifying the call to ACP 11 so that ACP 11 may further route this call. Alternatively, 800 DB 9 could directly transmit the data to ACP 11 via the CCS network 7. ACP 11 then queries A-800 DB 13 with data identifying the call that it has received from OSO 5 (action block 209). A-800 DB 13 returns to ACP 11 the identification of an announcement point (ANNP) 17 (action block 210). Announcement point 17 is a toll switch equipped with a voice processing unit (VPU) 19 to make announcements for the Advanced 800 (terminating) customer and to recognize caller commands returned in response to that announcement. In the terminology of the stored program controlled network, ANNP 17 is also an action control point. ACP 11 sets up a connection to ANNP 17 over the public switched network (PSN) 15 (action block 211). The A-800 DB 13 sends a message to ANNP 17 giving the identification of the A-800 announcement to be provided to the caller and data for identifying the call (action block 212). In a departure from the prior art, the caller is connected to VPU 19 (action block 213). VPU 19 of ANNP 17 plays a prompting announcement asking the caller to speak a number in order to select among the plurality of services associated with the single Advanced 800 number (action block 219, FIG. 3). Test 221, a key step of the method entered via input lead 220, is used to recognize responses or commands which may be in the form of digits. If one or more commands are recognized (output lead 222), these commands are returned by a message to A-800 DB 13 (action block 223). If no commands are recognized (output lead 224), then a default response is returned to the A-800 DB 13 (action block 225); this may lead, for example, to the routing of the call to a general attendant. The messages to A-800 DB 13 include data, such as the calling telephone number, for identifying the call. In either case, (action blocks 226, 227) A-800 DB 13 returns a POTS number for reaching the desired or default destination, assumed in this case to be 213-555-1000 or 312-979-3255, respectively, to ACP 11 (action block 227). In response, ACP 11 releases the connection to ANNP 17 (action block 229) and requests a connection over the public switched network 15 to a facility of the called customer, for providing the selected service, which facility may be a private branch exchange (PBX), an automatic call distributor (ACD), an individual customer station or an announcement facility, at the POTS number specified by A-800 DB 13.

While this description assumes that announcements from a business are returned from called customer facilities identified by a directory number and accessed via the public switched network, such announcements could also be provided, for example, from the announcement point. The POTS number, convenient for routing to called customer facilities, is just one example of an address for reaching an attendant or announcement or other facility. Any address that can be interpreted by ACP 11 or ANNP 17 to connect a caller to the correct destination, including, for example, a specific announcement provided, for example, by ANNP 17, is adequate for the purposes of this invention. Further, while in this example, only one digit or command is requested from a customer by the announcement, a group of digits or commands could readily be requested, and the flow chart modified in a straightforward manner to process this case.

Figure 3:
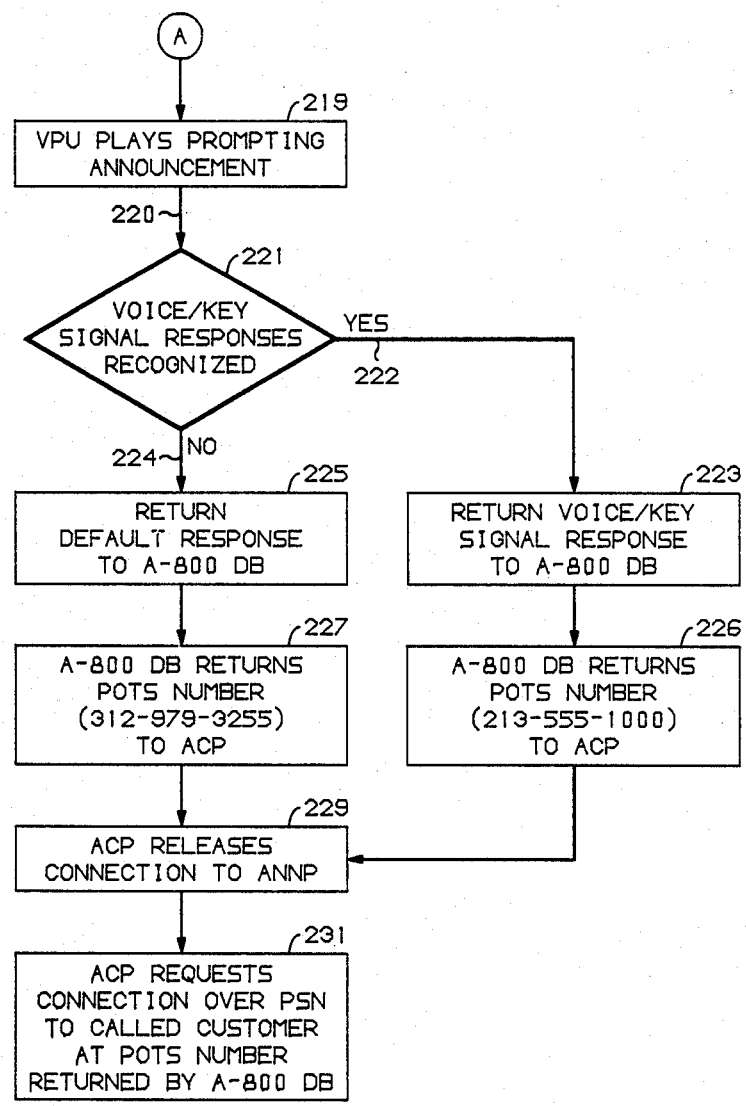
Figure 4:
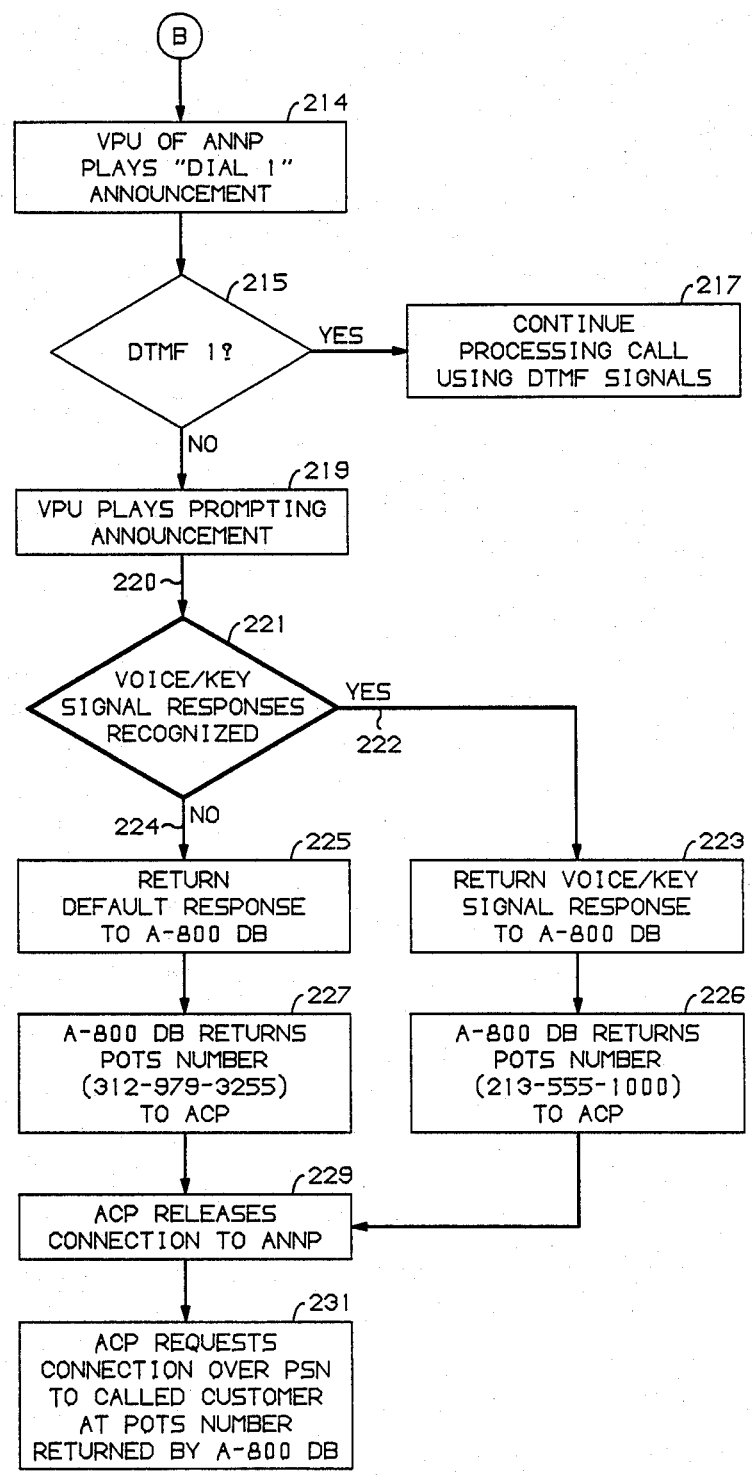

An alternative method is illustrated in FIG. 4 which includes all blocks shown on FIG. 3 plus blocks 214, 215, and 217 interposed between blocks 213 and 219. The preliminary steps illustrated in FIG. 2 are the same in the alternative method. After the caller has been connected to voice processing unit 19 (action block 213, FIG. 2), VPU 19 plays a dial 1 announcement requesting the caller to dial or key 1 (action block 214, FIG. 4). The purpose of requesting the caller to dial or key 1 is to detect whether the caller has a DTMF station or a dial or keyed dial pulse station (test 215). In the former case, VPU 19 is set to check for DTMF signals only (action block 217). In the latter case, as previously described, VPU 19 plays announcements prompting the caller to speak a command in order to select among the plurality of services associated with the single Advanced 800 number (action block 219, same as in FIG. 3). The altlernative arrangement makes it possible to prompt DTMF station callers differently from the dial or keyed dial pulse station callers but has the disadvantage of requiring an additional announcement step.

In messages from a switch to a data base, it is necessary to retain data associated with a call since the speech command comprises insufficient data to determine a call destination. In the illustrative embodiment, such data comaprises the caller directory number (including the caller NPA) and the called number which generally uniquely identify a call and intermediate data, i.e., the 195 number discussed with respect to block 205 to simplify a subsequent data access by the A-800 data base. It may also be desirable to include call path data to simplify the process of changing or extending connections of the call. Data directly specifying the number dialed or keyed, or, more generally, specified (for example, from a computer terminal) by the caller, or data derived from that number (for example, the 195 number discussed with respect to action block 205) is used for accessing the appropriate segment of the A-800 data base. Data identifying the speech command or keyed command is used for accessing routing data within that segment. Data directly or indirectly specifying the caller NPA is useful for routing calls from different geographic areas to the same service, e.g., a general information attendant, to different physical destinations, in accordance with principles described in Weber.

Figure 5:
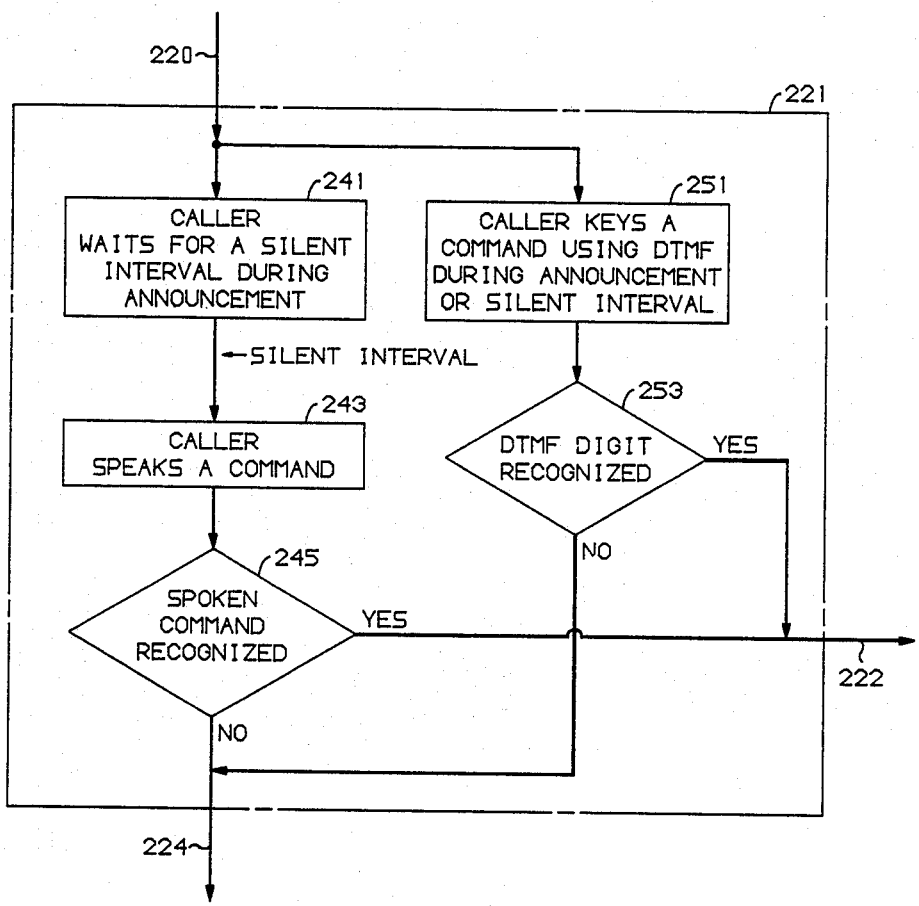
FIG. 5 shows further detail of one of the blocks in the flow diagrams of FIGS. 3 and 4.

FIG. 5 illustrates further details of the step of detecting caller commands (decision block 221). The announcement consists of a series of phrases with a silent interval between each pair of members of the series. For callers who are not calling from a DTMF station, it is necessary to wait for a pause at the end of a partial or full announcement specifying one of a plurality of commands so that VPU 19 may recognize a spoken command without encountering interference from the outgoing speech signal of the announcement. The caller waits for the end of a partial announcement (action block 241) and then speaks a command (action block 243). If the spoken command is recognized, then this corresponds to the "yes" output of decision block 221 shown on output 222 of decision block 221. If no spoken command is detected, this corresponds to the "no" output of decision block 221 shown on output 224 of decision block 221. Although in this diagram only one digit or command is shown, a plurality of commands could be requested by making straightforward additions to the method without departing from the principles of the invention.

If the caller is calling from a DTMF key station, the caller can key a command at any time even in the middle of an announcement (action block 251). A check is made (decision block 253) whether a DTMF command (digit) has been recognized. The "yes" output of decision block 253 corresponds to the "yes" output of decision block 221 and is shown on output lead 222 whereas the "no" output of decision block 253 corresponds to the "no" output of decision block 221 and is shown on output lead 224. Advantageously, this type of arrangement allows for the rapid recognition of DTMF signals while still permitting the recognition of spoken commands. If the method of FIG. 4 is used to separate DTMF station callers from others, then it is possible to prompt DTMF station callers differently from the other users. Note that while this description has assumed that customer stations which can generate recognizable tone signals are DTMF stations, any type of station for generating tone signals that can be transmitted through an interconnection network to a speech/tone or tone recognition unit would serve equally well to generate recognizable signals in addition to the speech commands.

The voice processing unit 19 can alternatively be attached to the ACP 11 unit and the translation from 800 DB 9 can provide for a selection among ACPs to ensure that the ACP for handling a call to a particular Advanced 800 number is an ACP equipped with the announcements for that Advanced 800 customer. In that case, it is not necessary to set up a separate connection to ANNP 17 but it is necessary to ensure that announcements from any Advanced 800 customer be distributed to some ACP accessible from any OSO whose customers can legitimately dial the number of that Advanced 800 customer.

Note that although the arrangement described is limited to 10,000 Advanced 800 customers (because only four decimal digits identifying the Advanced 800 customer are returned with the 195 message shown in action block 205) the flexibility of message exchange using the CCS network is such that additional digits can readily be added if the need arises. For example, full flexibility can be provided by accessing the A-800 data base using the full called directory number and the caller NPA code.

The basic principles of this invention have been described with respect to Advanced 800 Service. However, these principles can also be used generally to permit customers to use spoken commands such as digits to further select among a plurality of destinations associated with a single telephone number.

Note that while in the specific embodiment it was assumed that the OSO, ACP and ANNP were separate switches, this need not be the case if a specific toll switch is equipped to process Advanced 800 Service (in which case OSO 5 and ACP 11 may be the same switch) and/or in case the ACP is equipped to generate the announcement required for a specific Advanced 800 customer (in which case ACP 11 and ANNP 17 may be the same switch). Further, if a combined local/toll switch is used, then local switch 3 and OSO 5 may be the same switch. Further, for some applications, large PBX's or other customer terminal equipment may be connected directly to PSN 15, bypassing local switch 27. All of these variations can be implemented in a straightforward manner without departing from the principles of the invention.

Although the illustrative embodiment showed separate 800 and A-800 data bases, more generally, any data base means which supply the data required as discussed could be used. For example, for some applications, it may be desirable to use a single data base for both the basic and Advanced 800 Service. Further, while in the exemplary embodiment a separate data base is used for the basic and Advanced 800 Service, either or both of these data bases may be added to the ACP; however, as has been pointed out in Weber, there are significant advantages to using a centralized data base for each separate 800 telephone number, and by implication, for each separate Advanced 800 telephone number in order to keep track of the number of calls being set up to a particular 800 or Advanced 800 destination. Also, while the illustrative embodiment describes a service (IN-WATS) wherein the called customer is charged for the call, the same principles may be used for calls wherein the calling customer is charged.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. A method of processing a call through a common carrier network serving a plurality of non-common carrier communication facilities, comprising:
   sending calling data comprising data received from a caller of said call to a data base means;
   deriving in said data base means announcement identification data in response to said received data;
   sending said announcement identification data from said data base means to said common carrier network;
   prompting said caller with a prompting announcement, identified by said announcement identification data, to issue a speech command;
   sending a speech signal command to automatic speech recognition means for recognizing said speech command;
   generating speech command data in response to a recognition of said speech command by said recognition means;
   sending call data including said speech command data to said data base means;
   deriving from said data base means call routing data for said call in response to said call data; and
   routing said call through said common carrier network in response to said routing data.

2. The method of claim 1 wherein said common carrier network comprises an action control point, wherein said call is connected to said action control point, and wherein routing said call comprises sending said call routing data from said data base means to said action control point for routing said call through said common carrier network.

3. The method of claim 2 wherein said call routing data comprises the address of one of said plurality of non-common carrier communication facilities.

4. The method of claim 3 wherein said address comprises a telephone number.

5. The method of claim 3 wherein said calling data comprises data representing a telephone number specified by said caller and data representing at least a subset of a number identifying said caller.

6. The method of claim 5 wherein said step of sending said call data comprises the step of assembling a data message comprising data representing said speech command data and transmitting said data message over a common channel signaling system interconnecting said common carrier network and said data base means.

7. A method of processing a call through a common carrier network serving a plurality of non-common carrier communication facilities, comprising:
   prompting a caller on said call with a prompting announcement to issue a speech command;
   sending said speech command to automatic speech recognition means for recognizing said speech command;
   generating speech command data in response to said recognition means recognizing said speech command;
   sending call data including said speech command data to a data base means; and
   receiving, in said common carrier network from said data base means, call routing data, derived in said data base means in response to said call data including said speech command data, for routing said call through said common carrier network.

8. The method of claim 7 further comprising:
   prior to said prompting, sending calling data, comprising data received from said caller, to said data base means; and
   receiving from said data base means announcement identification data identifying said prompting announcement.

9. A method of processing a call through a common carrier network serving a plurality of non-common carrier communication facilities, comprising:
   receiving, in a data base means from said common carrier network, calling data comprising data received from a caller;
   deriving in said data base means announcement identification data in response to receipt of said calling data;
   sending said announcement identification data from said data base means to said common carrier network for identifying to said common carrier network a prompting announcement for prompting said caller to issue a speech command;
   receiving, in said data base means from said common carrier network, speech command data generated in response to recognizing said speech command on said dall, and other calling data comprising data received from a caller of said call;
   deriving in said data base means call routing data for said call in response to said speech command data and said other calling data; and
   sending said call routing data from said data base means to said common carrier network for routing said call through said common carrier network.

10. In a common carrier network arrangement for serving a plurality of non-common carrier communication facilities, a switching system for routing a call through said common carrier network arrangement from a caller to one of said plurality of non-common carrier communication facilities, comprising:
    automatic speech recognition means responsive to a receipt of a speech command from said caller for generating speech command data therefor; and
    switch means for connecting said call to said automatic speech recognition means, and comprising processor means, and controllable by said speech command data for generating a first data message, said first data message comprising call data including said speech command data, for transmission to a data base means to request call routing information therefrom;

wherein said processor means further selects a prompting announcement in response to a second data message receivable from said data base means for identifying said prompting announcement; and said switching system further comprising means for generating said prompting announcement for transmission on said call for prompting said caller to issue said speech command.

11. The switching system of claim 10 wherein said automatic speech recognition means further comprises means for generating one signal data representing a recognized tone signal;

wherein said processor means generates a third data message comprising said tone signal data for transmission to said data base means to request call routing information therefrom.

12. The switching system of claim 11 wherein said recognized tone signal is a dual tone multifrequency signal.

13. A method of processing a call from a caller through a common carrier network to one of a plurality of destinations, said destinations being non-common carrier communication facilities served by said common carrier network, said call being routed via an action control point of said common carrier network, comprising:

determining that said call is a special class of call in response to a receipt of a directory number for said call;

in response to said determining, sending a first data message comprising data identifying said directory number and data identifying the area code of said caller over a common channel signaling data network to a first data base to derive a call control message;

in response to said first data message, determining if said call requires advanced special service and transmitting a call control message to said common carrier network, said call control message comprising an advanced special service indicator if it is determined that said call requires advanced special service;

in response to said call control message, if said call control message comprises said advanced special service indicator, sending a second data message comprising data for identifying said call over said common channel signaling data network to a second data base to determine the identity of a prompting announcement, said data for identifying said call comprising data identifying said area code of said caller;

connecting said call to an announcement point having automatic speech recognition means for recognizing speech commands from said caller;

responsive to said second data message, identifying a prompting announcement for said call and sending a prompting data message from said second data base to said announcement point, said prompting data message comprising data for identifying a prompting announcement for said call;

connecting the identified prompting announcement to said call for prompting said caller therewith for requesting said caller selectively to provide a speech command or a keyed tone signal for specifying a desired call service connection;

generating speech command data in response to recognizing said speech command in said automatic speech recognition means during a silent interval of said prompting announcement;

sending a first response data message from said announcement point to said second data base in response to said speech command data, said first response data message comprising said speech command data and said data for identifying said call;

generating tone signal data in response to recognizing said keyed tone signal in said automatic speech recognition means, said keyed tone signal being recognizable during a silent interval of said prompting announcement and recognizable during a non-silent portion of said prompting announcement;

sending a second response data message to said second data base in response to said tone signal data, said second response data message comprising said tone signal data and said data for identifying said call;

in response to a failure to recognize said speech command or said keyed tone signal in said automatic speech recognition means, sending a third response data message to said second data base, said third response data message comprising data representing said failure to recognize and said data for identifying said call;

responsive to receipt of any of said response data messages, deriving a third data message in said second data base under the control of data provided by said any of said response data messages, said third data message comprising data determining a call destination;

transmitting said third data message to said action control point of said common carrier network connected to said call; and routing said call from said action control point through said common carrier network to said call destination determined by said data determining a call destination.

14. A call control data base method for a common carrier network comprising:

receiving first call data for a call;

deriving first routing information from a data base means linked to said common carrier network in response to said received first call data;

sending said first routing information from said data base means to said common carrier network for routing said call to a speech recognition means;

receiving second call data, including speech data recognized by said speech recognition means on said call, at said data base means from said common carrier network;

deriving second routing information from said data base means for said call in response to the received second call data; and sending the derived second routing information from said data base means to said common carrier network;

wherein said sending the derived second routing information comprises sending said second routing information to said common carrier network for routing said call.

15. The method of claim 14 further comprising the steps of:

receiving third call data after receiving said first call data and prior to receiving said second call data;

deriving prompting selection data from said data base means for selecting a prompting announcement; and sending said prompting selection data to said common carrier network for connection of the selected prompting announcement to said call.

16. The method of claim 15 wherein said data base means comprises a first and a second data base, and wherein said first routing information is derived from said first data base and said second routing data and said prompting selection data are derived from said second data base.

* * * * *

UNITED STATES PATENT AND TRADEMARK OFFICE
CERTIFICATE OF CORRECTION

PATENT NO. : 4,827,500

DATED : May 2, 1989

INVENTOR(S) : Mark S. Binkerd, Christine M. Buss, George W. Gawrys, Roger E. Stone It is certified that error appears in the above-identified patent and that said Letters Patent is hereby corrected as shown below:

Column 10, claim 9, line 44, delete "dall" and substitute --call--.

Column 11, claim 11, line 11, delete "one" and substitute --tone--.

Signed and Sealed this

Twenty-ninth Day of May, 1990

Attest:

HARRY F. MANBECK, JR.

*Attesting Officer*      *Commissioner of Patents and Trademarks*